March 25, 1969     R. D. BAUER     3,434,701

VAPOR-LIQUID CONTACTING APPARATUS

Filed Aug. 15, 1966

INVENTOR
R. D. BAUER

BY Young & Quigg

ATTORNEYS

United States Patent Office 3,434,701
Patented Mar. 25, 1969

3,434,701
VAPOR-LIQUID CONTACTING APPARATUS
Robert D. Bauer, Bartlesville, Okla., assignor to Phillips Petroleum Company, a corporation of Delaware
Filed Aug. 15, 1966, Ser. No. 572,317
Int. Cl. B01d 3/22
U.S. Cl. 261—114                                          6 Claims

ABSTRACT OF THE DISCLOSURE

This invention is a vapor-liquid contacting apparatus in which a plurality of vertically-spaced horizontal trays having perforations permitting vapor flow upward therethrough are provided with downcomers at opposite sides, one from the tray above, the other to the tray below, and liquid flow over the tray from one downcomer to the other is directed in a serpentine path by a plurality of baffles extending in opposite directions so that the direction of flow in turning around the ends of the baffles alternates in opposite directions. In FIGURES 2 and 3 there is one tray at each level and only two baffles 26 and 27. In FIGURE 4 there are a plurality of trays (specifically two trays 38 and 38') at each level. The flow may go from the outer to the inner part of the column on one level and from the inner to the outer part on the next level. In FIGURE 5 there are at least three baffles 52, 53 and 54.

---

This invention relates to the separation of fluid mixtures by fractional distillation. In another aspect it relates to improved vapor-liquid contacting apparatus.

It is common practice to separate fluid mixtures by fractional distillation, and various types of vapor-liquid contacting devices have been designed for use in fractionation columns. In some operations, it is desirable or necessary to introduce the feed into the upper region of the distillation column. This can have the undesired effect of permitting some of the heavy constituents, which should be removed as kettle product, to appear in the overhead vapors. There are at least two reasons why this can occur. One is the entrainment of the heavy constituents in the vapors; the other is by what is commonly called "blowing." Blowing is likely to occur when there is insufficient reflux or liquid on the upper trays in the column. In this situation, the rising vapors are actually blown upwardly and out of the column without proper rectification. Thus, heavy constituents appear in the overhead vapors.

One possible solution to this problem would be to increase the flow or reflux in the column to provide a greater amount of liquid on the upper trays. However, there is often a physical limit to the amount of vapor which can be removed overhead. Since all of the reflux must eventually pass overhead as vapor and then be recondensed, the physical limitations on the overhead vapor removal often prevent the necessary increase of external reflux. In addition, it is more economical to operate the column with a smaller amount of reflux.

In accordance with this invention, a system is provided which eliminates blowing in fractionation columns without increasing the total reflux flow. Novel vapor-liquid contacting apparatus is employed in the upper region of the column so as to increase the usefulness of the reflux without actually increasing the total volume of reflux. The contacting apparatus of this invention employs a series of baffles positioned on the trays so as to direct the liquid flow in a serpentine path across the trays. The baffles are arranged so that there are at least two reversals in direction of flow across each tray. Thus, at least three separate flow paths are established. The trays are provided with a plurality of openings so that vapor is allowed to bubble upwardly through the flowing liquid. This has the practical effect of dividing the vapor into parallel flow paths. The vapor rising through each of the liquid flow paths thus contacts the entire quantity of reflux liquid flowing along the tray. When three substantially equal flow paths are established by the baffles, the liquid reflux in each vapor path is effectively tripled without actually increasing the reflux load on the column.

Accordingly, it is an object of this invention to provide an improved system for separating fluid mixtures by fractional distillation. Another object is to provide novel vapor-liquid contacting means. A further object is to provide a system for increasing the effective flow of reflux in a distillation column without actually increasing the total reflux load. Other objects, advantages and features of the invention should become apparent from the following detailed description, taken in conjunction with the accompanying drawing in which.

Figure 1:
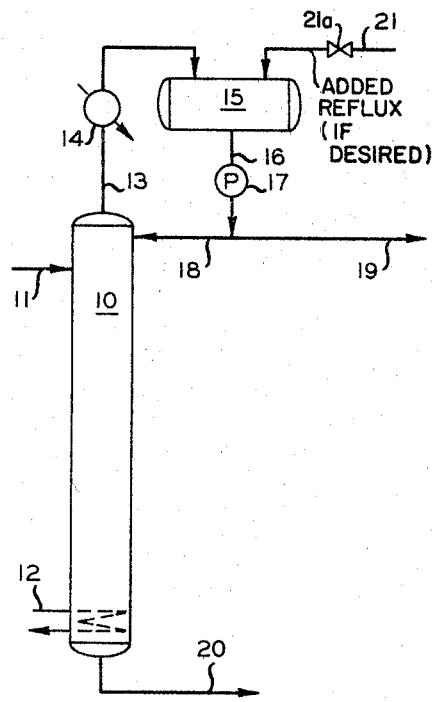
FIGURE 1 is a schematic representation of a fractional distillation system in which the contacting apparatus of this invention can be employed.
Figure 6:
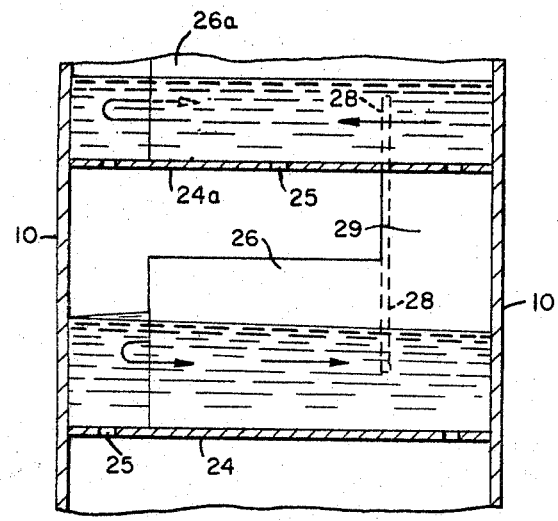
FIGURE 6 is a cross-sectional view of FIGURE 3 taken along the line 6—6 looking in the direction indicated.
Figure 7:
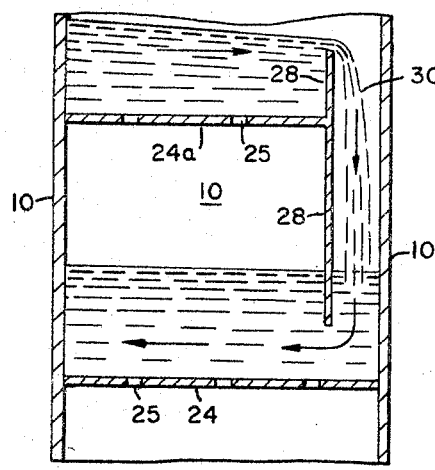
FIGURE 7 is a similar view taken along the line 7—7 of FIGURE 3.

Referring now to the drawing in detail and to FIGURE 1 in particular, there is shown a fractionation column 10. A fluid mixture to be separated is introduced into the upper region of column 10 through an inlet conduit 11. In one specific embodiment of this invention, column 10 has 50 vapor-liquid contacting trays, and conduit 11 introduces the feed at the 45th tray from the bottom. Heat is supplied to the lower region of column 10 by any conventional means 12. Vapors are removed from the top of column 10 through a conduit 13 which has a condenser 14 therein. The resulting condensate is introduced into a reflux accumulator 15. Liquid is removed from accumulator 15 through a conduit 16 which communicates with the inlet of a pump 17. A portion of this liquid is directed by pump 17 through a conduit 18 which communicates with the top of column 10. The remainder of the liquid passed through pump 17 is removed through an overhead product conduit 19. A kettle product is removed from column 10 through a conduit 20. Additional reflux liquid can be introduced into accumulator 15 through a conduit 21 by opening valve 21a, for example.

Figure 3:
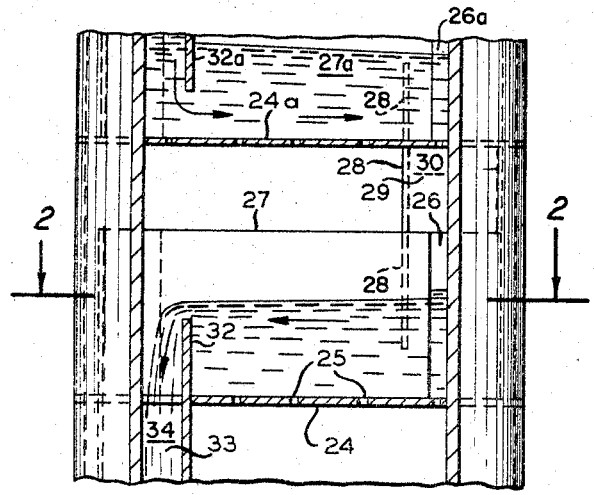
FIGURE 3 is a view taken along line 3—3 in FIGURE 2.

In apparatus of the type illustrated in FIGURE 1, there is the danger of blowing occurring. In order to overcome this possibility, the liquid-vapor contacting devices positioned between the point of feed introduction and the top of the column are of the configuration illustrated in FIGURES 2 and 3. Each contacting device comprises a horizontal tray 24 which is provided with a plurality of openings 25 to permit the upward flow of vapor. Two vertically extending baffles 26 and 27 are mounted on tray 24 in spaced relationship with one another so as to divide the tray into three zones that are in communication. Vertical plates 28 and 29 extend upwardly from regions spaced above tray 24 to a region above the next higher tray 24a. Plate 29 is a vertical extension of plate 26 which, together with plate 28, forms a vertically extending passage 30. Liquid on tray 24a flows over the top of plate 28 and downwardly through passage 30 toward tray 24. This liquid flows under plate 28 and along the surface of tray 24 in the serpentine path indicated by the arrows. Vertical plates 32 and 33 extend downwardly from tray 24 to form a fluid passage 34. Plate 33 is a vertical extension of plate 27, and plate 32 extends above tray 24 to form a weir. Liquid is removed from tray 24 by flowing over the weir and downwardly through passage 34.

Figure 2:
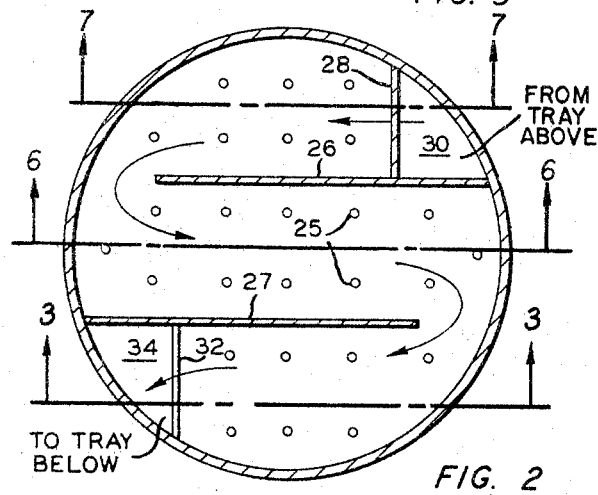
FIGURE 2 is a sectional view illustrating an embodiment of the vapor-liquid contacting equipment.

From an inspection of FIGURE 2 it can be seen that the liquid flow across tray 24 follows three separate horizontal paths in series. Thus, the vapors which flow upwardly through holes 25 in tray 24 in each of the horizontal paths contact the entire amount of liquid flowing across the tray. This effectively increases the amount of liquid which is contacted by the vapors, and thus prevents blowing of liquid from the top of column 10 of FIGURE 1. It is desirable that baffles 26 and 27 be spaced so that the liquid flow path is of substantially uniform volume.

Figure 4:
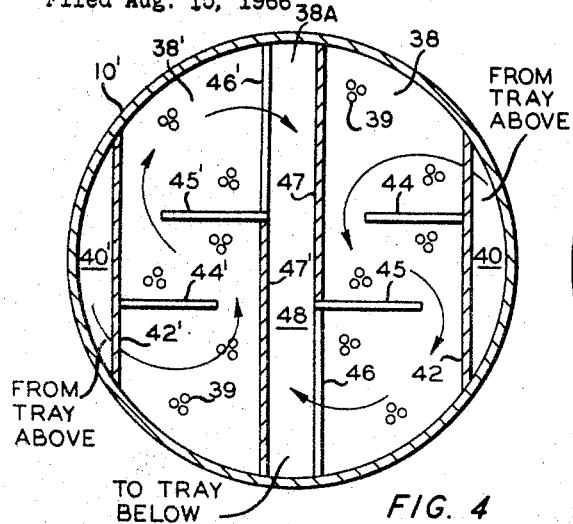
FIGURE 4 is a sectional view illustrating a second embodiment of the contacting apparatus.
Figure 8:
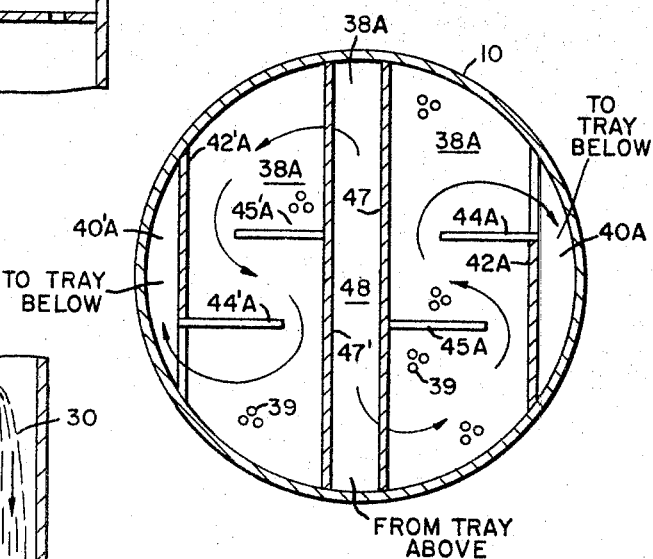
FIGURE 8 is a plan view similar to FIGURE 4 showing the arrangement of the tray 38A below FIGURE 4 as described originally.

A second embodiment of the contacting apparatus of this invention is illustrated in FIGURE 4. Column 10' is provided with a horizontal tray 38 which has a plurality of holes 39 therein through which vapors pass upwardly. A plate 42, which corresponds generally to plate 28 of FIGURE 2, extends from a region above tray 38 upwardly to a region above the next uppermost tray. This forms a fluid passage 40 to direct liquid downwardly to tray 38. Vertical baffle plates 44 and 45 are mounted on tray 38 to divert the liquid flow. A vertical plate 46 extends from a region slightly above tray 38 downwardly to the next lowermost tray. The liquid thus flows over the top of plate 46 and downwardly through a passage 48. Passage 48 is defined by spaced vertically extending plates 47 and 47'. The next lowermost tray 38a is of substantially the same configuration except that the liquid flow follows a reversed path. Parts on tray 38A are shown in detail in FIGURE 8, with parts corresponding to those in FIGURE 4 given the same number with an A added to them to avoid confusion. The left-hand portion 38' of the tray 38 is provided with similar baffles and plates which are designated by like primed reference numerals. Thus, the apparatus of FIGURE 4 provides two separate contacting regions on each tray.

Figure 5:
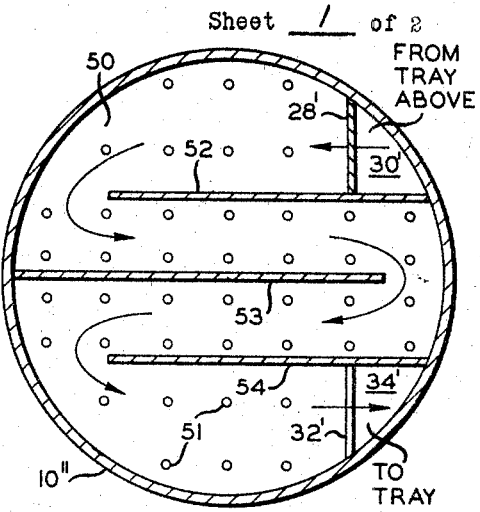
FIGURE 5 is a sectional view illustrating a third embodiment of the contacting apparatus.

A third embodiment of the liquid-contacting apparatus of this invention is illustrated in FIGURE 5. This apparatus is similar in many respects to that shown in FIGURE 2 and corresponding elements are designated by like primed reference numerals. In the apparatus illustrated in FIGURE 5, a tray 50 is mounted within a column 10". This tray is provided with holes 51 through which the vapor rises. The apparatus of FIGURE 5 differs from that of FIGURE 2 in that three vertical plates 52, 53 and 54 are mounted on tray 50. These three baffle plates thus result in four individual horizontal flow paths for the liquid, as illustrated. It should be evident from an inspection of FIGURES 2 and 5 that even more baffle plates can be added, if desired, to increase the number of individual flow paths for the liquid across the tray.

As previously mentioned, the trays above the feed inlet are constructed according to this invention. The trays below the feed inlet can be of any desired configuration, but can be the same as the trays above the feed inlet, if desired.

While this invention has been described in conjunction with presently preferred embodiments, it obviously is not limited thereto.

What is claimed is:
1. Vapor-liquid contacting apparatus comprising in combination a column having a plurality of vertically-spaced horizontally-disposed trays therein each provided with a plurality of vapor openings through which vapor is permitted to pass upwardly, at least a first of said trays intermediate the top and bottom trays, having at a first point a first linear weir and a first downcomer conduit having an inlet for liquid connected to said tray on the other side of said weir from the vapor openings of said tray, said conduit extending down adjacent to the next lower tray to a point lower than the liquid level thereon, said first tray having a second point spaced from said first point adapted to receive liquid from a second downcomer conduit from the next tray above, said second conduit extending lower than said first weir, the area of said first tray being formed into a serpentine path permitting flow of liquid from said second point to said first point by a plurality of planar baffles secured to said first tray and extending vertically above said first weir and the liquid on said first tray, said baffles extending from the edge of said first tray disposed alternately in opposite directions and spaced at positions between said second point and said first point, with the direction of flow of the liquid in turning in series around the ends of the baffles alternating in opposite directions, each of said downcomer conduits being formed by the intersection of a planar plate with the side wall of the column, the top edge of the plate providing the linear weir.

2. The combination of claim 1 in which there are at least three baffles on said first tray.

3. The combination of claim 1 in which each level of said vertically-spaced horizontally-disposed trays comprises a plurality of trays, each tray having a liquid receiving point, a weir and a downcomer conduit having an inlet connected thereto on the other side of the weir, each of said trays having their upper surface area formed into a serpentine path by a plurality of baffles extending upwardly from said tray above the liquid level thereon and disposed between said second point and said first point and extending alternately in opposite directions from the opposite edges of said tray, with the direction of flow of liquid in turning in series around the ends of the baffles alternating in opposite directions.

4. The combination of claim 3 in which the flow across the plurality of trays on one level is from an outer portion of the column to an inner portion, and the flow on the trays on the next level is from an inner portion of the column to an outer portion.

5. Vapor-liquid contacting apparatus comprising in combination a column having a vertical cylindrical shell, said column having a plurality of vertically-spaced horizontally-disposed tray units therein, one of said tray units comprising a pair of horizontally-disposed first tray units extending from one side of said shell to the other separated by a central passageway, the central passageway providing a downcomer conduit from the tray unit to a tray unit below, the passageway being formed by the intersection of planar vertical wall sections with the cylindrical shell, the planar vertical wall sections extending from the first tray unit above to a second tray unit therebelow the upper portions of each wall section extending above the normal liquid level of the first tray unit and providing a linear weir, the lower edge of each wall section extending below the normal liquid level of the said tray unit therebelow but spaced from the lower tray unit, the outer portion of each of said first tray unit sections having second planar vertical wall sections extending to a third tray unit thereabove and forming with the cylindrical shell a second downcomer conduit, the upper edge of the second planar vertical wall section extending above the third tray unit and providing a linear weir for the third tray unit and extending to a point spaced from the said first tray unit but below the liquid level thereon, and a plurality of planar baffles extending upwardly from the upper surface of each of said first tray units above said weir extending alternately in opposite directions from said opposite first and second vertical walls, at least the first of said baffles extending from a point on said second vertical wall inside said second downcomer opening toward but short of said first vertical wall, and at least another of said baffles extending from a point on said first vertical wall inside said weir section toward but short of said second vertical wall and overlapping but spaced from said first baffle.

6. The combination of claim 5 in which in the next vertically-spaced tray unit below said first tray unit, a weir replaces the downcomer opening in the first vertical wall, and a downcomer opening replaces the weir in the second vertical wall, and the liquid flow follows a reversed serpentine path around the ends of the baffles.

References Cited

UNITED STATES PATENTS

| | | | |
|---|---|---|---|
| 1,811,247 | 6/1931 | Smith | 261—114 |
| 2,646,977 | 7/1953 | Kraft | 202—158 X |
| 2,713,478 | 7/1955 | Ragatz | 202—158 X |
| 2,926,754 | 3/1960 | Ragatz | 261—114 X |
| 2,973,189 | 2/1961 | Ju Chin Chu | 202—157 X |
| 3,022,054 | 2/1962 | Kotzebue | 202—158 X |
| 3,162,700 | 12/1964 | Irons | 261—114 |
| 3,338,566 | 8/1967 | Kittel | 261—113 |

FOREIGN PATENTS

| | | |
|---|---|---|
| 1,094,049 | 12/1954 | France. |
| 406,980 | 3/1934 | Great Britian. |
| 823,610 | 11/1959 | Great Britian. |

NORMAN YUDKOFF, *Primary Examiner.*

F. E. DRUMMOND, *Assistant Examiner.*

U.S. Cl. X.R.

55—206; 196—98; 202—158